(12) United States Patent
Sweeting et al.

(10) Patent No.: US 10,451,478 B2
(45) Date of Patent: Oct. 22, 2019

(54) METHOD AND APPARATUS FOR THE DETECTION OF EXPOSURE TO ULTRAVIOLET LIGHT

(71) Applicant: 8996598 CANADA INC., Mississauga (CA)

(72) Inventors: Chad Mitchell Sweeting, Penetanguishene (CA); Derek Matti Harry Jouppi, Kitchener (CA); Andrew Bradley Martinko, Oakville (CA); Marc William Gibson, Kitchener (CA); Tim Wu, Waterloo (CA); Kevin Quang Vinh Dang, Guelph (CA); Cameron Spencer Mills, Belleville (CA); Sabrina Chwen-Huei Chang, Kitchener (CA)

(73) Assignee: 8996598 CANADA INC., Mississauga (CA)

( * ) Notice: Subject to any disclaimer, the term of this patent is extended or adjusted under 35 U.S.C. 154(b) by 0 days.

(21) Appl. No.: 16/074,618

(22) PCT Filed: Feb. 1, 2017

(86) PCT No.: PCT/IB2017/050547
§ 371 (c)(1),
(2) Date: Aug. 1, 2018

(87) PCT Pub. No.: WO2017/134583
PCT Pub. Date: Aug. 10, 2017

(65) Prior Publication Data
US 2019/0041261 A1 Feb. 7, 2019

Related U.S. Application Data

(60) Provisional application No. 62/436,844, filed on Dec. 20, 2016, provisional application No. 62/290,140, filed on Feb. 2, 2016.

(51) Int. Cl.
*G01J 1/50* (2006.01)
*G01J 1/42* (2006.01)

(52) U.S. Cl.
CPC ............ *G01J 1/50* (2013.01); *G01J 1/429* (2013.01); *G01J 2001/4266* (2013.01)

(58) Field of Classification Search
CPC ........ G01J 1/50; G01J 1/429; G01J 2001/4266
(Continued)

(56) References Cited

U.S. PATENT DOCUMENTS

| 4,705,046 A | 11/1987 | Robillard |
| 4,829,187 A | 5/1989 | Tomita et al. |

(Continued)

FOREIGN PATENT DOCUMENTS

| WO | WO-0203949 A2 | 1/2002 |
| WO | WO-2005067580 A2 | 7/2005 |
| WO | WO-2017134583 A1 | 8/2017 |

OTHER PUBLICATIONS

International Search Report dated Apr. 25, 2017 for PCT Internatioanl Application No. PCT/IB2017/050547.

(Continued)

*Primary Examiner* — David P Porta
*Assistant Examiner* — Meenakshi S Sahu
(74) *Attorney, Agent, or Firm* — Perry + Currier Inc.

(57) ABSTRACT

A device for detecting exposure to light includes: a photo-responsive layer including a photochromic material; a skin-mimicking cover layer covering a first side of the photo-responsive layer; and an adhesive layer configured to couple a second side of the photo-responsive layer opposite the first side to a surface.

21 Claims, 8 Drawing Sheets

(58) Field of Classification Search
USPC ................................................. 250/474.1
See application file for complete search history.

(56) References Cited

U.S. PATENT DOCUMENTS

| | | | |
|---|---|---|---|
| 5,028,792 A | | 7/1991 | Mullis |
| 5,387,798 A | | 2/1995 | Funakoshi et al. |
| 5,581,090 A | | 12/1996 | Goudjil |
| 5,986,273 A | * | 11/1999 | Tripp ................. G01J 1/50 |
| | | | 250/474.1 |
| 6,046,455 A | | 4/2000 | Ribi et al. |
| 6,130,435 A | | 10/2000 | Rocklin |
| 6,465,791 B1 | | 10/2002 | Ribi et al. |
| 6,818,904 B1 | | 11/2004 | Ferren et al. |
| 7,101,497 B2 | * | 9/2006 | Tanaka ................. C09K 9/02 |
| | | | 106/499 |
| 9,658,101 B1 | | 5/2017 | Levine et al. |
| 2002/0117633 A1 | * | 8/2002 | Questel ................ G01J 1/50 |
| | | | 250/474.1 |
| 2005/0067580 A1 | | 3/2005 | Fontaine |
| 2006/0001895 A1 | | 1/2006 | Yatomi |
| 2008/0185534 A1 | | 8/2008 | Simon et al. |
| 2008/0259315 A1 | | 10/2008 | Mersch |
| 2010/0198177 A1 | * | 8/2010 | Yahiaoui ............... A61F 13/82 |
| | | | 604/359 |
| 2014/0038305 A1 | | 2/2014 | Sharavara et al. |

OTHER PUBLICATIONS

Written Opinion of the International Searching Authority dated Apr. 25, 2017 for PCT International Application No. PCT/IB2017/050547.

ISA/CA, International Search Report and Written Opinion, dated Aug. 3, 2018, re PCT International Patent Application No. PCT/IB2018/053269.

WIPO/IB, International Preliminary Report on Patentability, dated Aug. 7, 2018, re PCT International Patent Application No. PCT/IB2017/050547.

* cited by examiner

METHOD AND APPARATUS FOR THE DETECTION OF EXPOSURE TO ULTRAVIOLET LIGHT

CROSS-REFERENCE TO RELATED APPLICATIONS

This application claims priority from U.S. provisional patent application Nos. 62/290,140 filed Feb. 2, 2016 and 62/436,844 filed Dec. 20, 2016. The contents of the above-referenced applications is incorporated herein by reference.

FIELD

The specification relates generally to detecting when surfaces are exposed to light, and specifically to a method and apparatus for the detection of exposure to ultraviolet light.

BACKGROUND

Ultraviolet (UV) light—light with a wavelength of approximately 10 nm to 400 nm—is emitted by the sun at all times. UV light can have a positive effect upon human health (e.g. by inducing the production of vitamin D), but excessive exposure can be dangerous. Overexposure to UV light can cause skin damage, resulting in sunburns and an increased risk of skin cancer. Consequently, skin protection products which block UV light, such as sunscreen creams, sprays, gels and the like, are often employed to protect the skin from prolonged exposure to the sun. Sunscreen products may be used in an inexact manner, however. Once applied, it may not be known when the sunscreen is no longer providing protection against UV light. Other solutions to determining whether the sunscreen is providing UV protection include estimating the duration provided by the manufacturer of the sunscreen found on the bottle, or systems that exist to warn users of their exposure through a time based method. Such solutions may be prone to inaccuracy, however, since sunscreen may wear off differently based on what activities or environment a user is in. As a result, it may not be apparent to the user that they are exposed and at risk of getting a sunburn. Different activities done outside, as well as different skin types, result in sunscreen wearing off of a user's skin at different rates, with the attendant possible deleterious effects of overexposure.

SUMMARY

According to an aspect of the specification, a device for detecting exposure to light is provided, including: a photo-responsive layer including a photochromic material; a skin-mimicking cover layer covering a first side of the photo-responsive layer; and an adhesive layer configured to couple a second side of the photo-responsive layer opposite the first side to a surface.

BRIEF DESCRIPTIONS OF THE DRAWINGS

Embodiments are described with reference to the following figures, in which.

DETAILED DESCRIPTION OF THE EMBODIMENTS

Figure 1A:
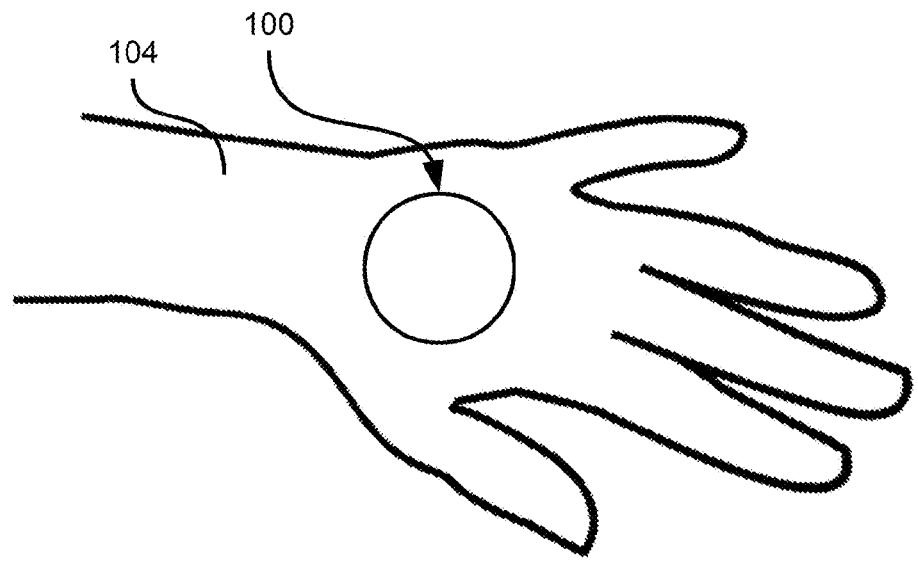
FIGS. 1 and 2 depict a device for detecting exposure to light in first and second visual appearances, according to a non-limiting embodiment.
Figure 1B:
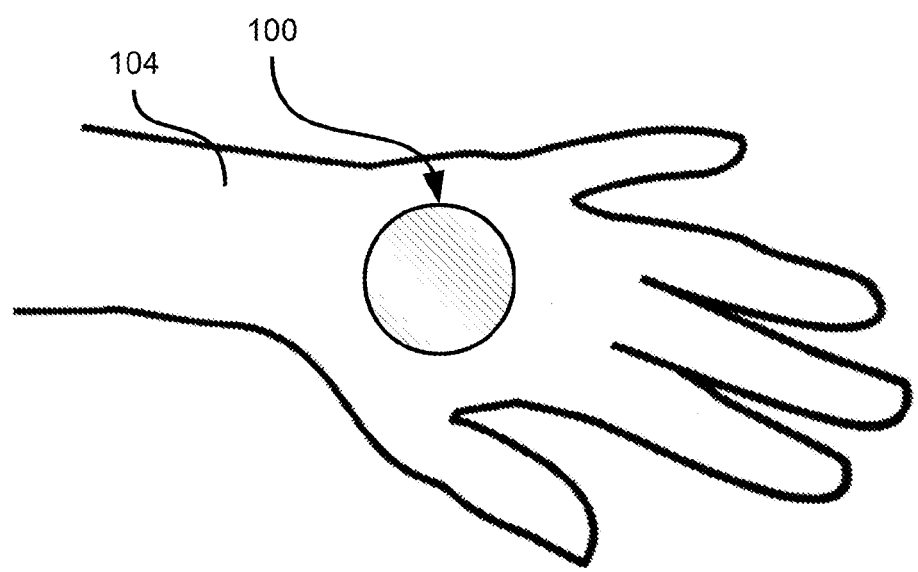

FIGS. 1A and 1B depict a device 100 for detecting exposure to light according to certain embodiments. More specifically, the device 100 is configured for attachment to a surface in order to detect exposure of the surface to light. In the example illustrated in FIGS. 1A and 1B, the device 100 is applied to the skin 104 of a human user in order to detect and indicate whether the skin 104 is exposed to light. In some embodiments, the device 100 detects and indicates whether the surface (e.g. the skin 104) is exposed to ultraviolet light having a wavelength of about 10 nm to about 400 nm, whether the surface is exposed to other wavelengths of light or not.

As will be apparent throughout the discussion herein, although the device 100 and variations thereof are described as being applied to human skin for detecting and indicating exposure to ultraviolet light, in other embodiments the device is applied to other surfaces. In further embodiments, the device is configured to detect and indicate other wavelengths of electromagnetic radiation than ultraviolet light.

As will be discussed below in greater detail, the device 100 includes a photo-responsive layer configured to have a first visual appearance in the presence of light of a predetermined wavelength. The photo-responsive layer is also configured to have a second visual appearance in the absence of the above-mentioned light. The term "visual appearance" as used herein refers to the appearance of the device 100 to human vision.

The photo-responsive layer is further configured to reversibly transition between the first and second visual appearances in response to the presence or absence, respectively, of the predetermined wavelength of light. As will be apparent to those skilled in the art, the terms "presence" and "absence" are used herein for illustrative purposes, but do not define absolute requirements. Thus, in some embodiments the device 100 transitions to the second visual appearance when light of the predetermined wavelength (e.g. ultraviolet) is present at sufficiently low levels, rather than entirely absent.

The device 100 is employed, in certain embodiments, to detect and indicate when the skin 104 of the user is exposed to ultraviolet light due to the absence of sunscreen (e.g. because no sunscreen has been applied, or because previously applied sunscreen has worn off, been chemically inactivated, or the like). FIG. 1A, for example, illustrates the device 100 in the absence of ultraviolet light (i.e. in the second visual appearance as mentioned above), due to the presence of sunscreen on the device 100 and surrounding skin 104. In the second visual appearance as shown in FIG. 1A, the device 100 is substantially colourless and transparent in the illustrated embodiment.

When the sunscreen has worn off (e.g. due to contact with water or other fluids such as sweat, physical abrasion or the like) or otherwise been rendered ineffective at absorbing ultraviolet radiation, the device 100, being exposed to the ultraviolet radiation, transitions to the first visual appearance as shown in FIG. 1B. In FIG. 1B, the device 100 has a predetermined colour, pattern or other visually distinctive property. Further, in some embodiments the device 100 as shown in FIG. 1B has a greater opacity in the first visual appearance than in the second visual appearance. As will be apparent, the re-application of sunscreen to the skin 104 and the device 100 reduces or eliminates exposure of the device 100 to ultraviolet radiation, in response to which the device 100 returns to the second visual appearance shown in FIG. 1A.

In other embodiments, the second visual appearance also has a visible colour, different from the colour of the first visual appearance. Preferably, the respective colours of the first and second visual appearance are contrasting (e.g. orange and purple). In further embodiments, the first visual appearance can be substantially colourless and transparent while the second visual appearance can have a predetermined colour and opacity.

The device 100 has various structural and material properties that permit the above-mentioned transitions between visual appearances not only to take place, but to take place at functionally appropriate times (e.g. when the sunscreen applied to the skin 104 adjacent to the device 100 has ceased to be effective at absorbing or reflective ultraviolet radiation). Those properties are discussed below in greater detail.

Figure 2:
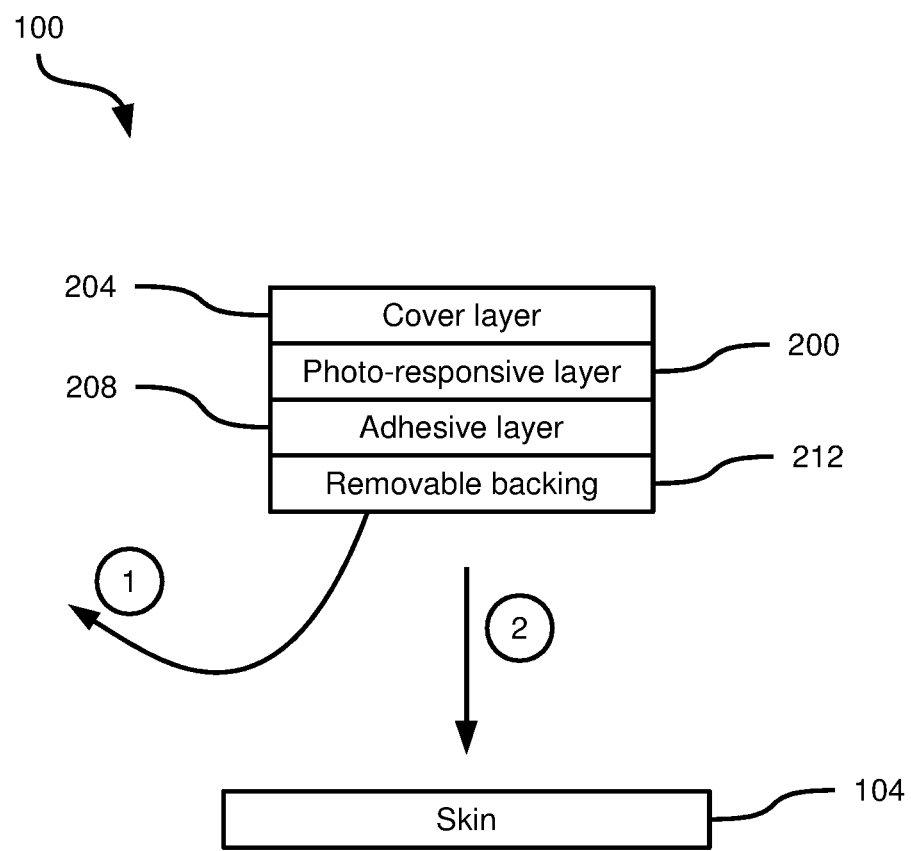

Turning to FIG. 2, a schematic cross-section of the device 100 according to certain embodiments is illustrated. As shown in FIG. 2, the device 100 includes the above-mentioned photo-responsive layer 200, which includes a photochromic material selected to provide the transitions between visual appearances described above. The device 100 also includes a skin-mimicking cover layer 204 (also referred to herein simply as the cover layer 204) covering a first side of the photo-responsive layer 200. The first side of the photo-responsive layer 200 that is covered by the cover layer 204 refers to the side of the photo-responsive layer 200 furthest from the skin 104 after application of the device 100 to the skin 104. The first layer may therefore also be referred to as the upper, or outer, layer of the device 100 (i.e. the layer furthest away from the skin 104 after the device 100 has been applied).

The composition and structure of the cover layer 204 will be discussed in greater detail below; in general, the composition and structure of the cover layer 204 simulate certain characteristics of the skin 104. For example, in some embodiments the cover layer 204 simulates the characteristics of the skin 104 that permit sunscreen to wear off. Thus, in some embodiments, the cover layer 204 permits sunscreen to wear away under the effects of abrasion, contact with water, and the like, at approximately the same rate as does the skin 104 under such effects.

The device 100 also includes an adhesive layer 208 configured to couple a second side of the photo-responsive layer 200 opposite the first side to a surface, such as the surface of the skin 104. In other words, the adhesive layer 208 forms the inner or lower surface of the device 100 when applied to the skin 104.

The adhesive layer 208 includes an adhesive coating applied to the lower side of the photo-responsive layer 200 or to the lower side of a layer connected between the photo-responsive layer 200 and the adhesive layer 208 (as will be seen below). Any suitable one of, or combination of, a variety of adhesives can be employed for the adhesive layer 208. In some embodiments, the adhesive layer 208 includes an acrylic-based adhesive for medical and/or surgical use, which is therefore suitable for removably binding to the skin 104. The adhesive layer 208 is preferably selected to be able to bind to the surface (e.g. the skin 104) in the presence of water (including freshwater, saltwater, sweat exuded from the skin 104, and the like). For example, in some embodiments the adhesive layer 208 includes medical-grade adhesives such as Pros-Aide™.

The device 100 also includes, in certain embodiments, a removable backing 212 affixed to the adhesive layer 208 before use of the device 100. In certain embodiments, a single sheet of removable backing 212 can support a plurality of devices 100. In other embodiments, a single piece of removable backing 212 is provided for each device 100. The removable backing 212 serves to prevent the inadvertent attachment of the adhesive layer 208 to surfaces other than the desired surface (e.g. the skin 104), as well as to prevent the adherence of debris to the adhesive layer 208 before use of the device 100.

A variety of materials can be employed to provide the removable backing 212, as will be apparent to those skilled in the art. In some embodiments, the removable backing 212 is made of a poly-coated kraft paper with silicone on the side facing the adhesive layer 208. In further embodiments, the removable backing 212 is made of antistatic-treated poly-coated kraft paper with silicone on the side facing the adhesive layer 208. The antistatic treatment may permit easier removal of the removable backing 212 prior to application of the device 100 to the skin 104.

In use, as will now be apparent to those skilled in the art, the removable backing 212 is removed (see encircled "1" in FIG. 2) shortly before application of the device 100 (see encircled "2" in FIG. 2) to the skin 104 or other target surface.

Various implementations are contemplated for the photo-responsive layer 200 and the cover layer 204, as will be discussed below. In each implementation, however, the photo-responsive layer 200 includes a photochromic material. Generally, photochromic materials are those which transition between different states in the presence of absence of light of various wavelengths, and therefore have different visual appearances (e.g. colours) in the presence or absence of the relevant type of light. The device 100, in embodiments in which detection and indication of ultraviolet radiation is provided, includes one or more photochromic materials in the photo-responsive layer 200 that transition between states in the presence or absence of ultraviolet light (i.e. between 10 nm and 400 nm in wavelength).

In some embodiments, the photo-responsive layer 200 includes a plurality of photochromic materials, each of which transitions at a different subset of the range of wavelengths defining ultraviolet light. In further embodiments, the photo-responsive layer 200 includes materials that are responsive (i.e. that undergo the above-mentioned transitions) not only to light, but also to temperature. Such materials are referred to as photo-thermochromic materials (also referred to as thermally reversible photochromic materials). Examples of photo-thermochromic materials include materials in the class referred to as spiropyrans, an example of which is 1,3,3-trimethylindolino-6'-nitrobenzopyrylospiran. For example, in some embodiments, the photo-responsive layer 200 includes a photo-thermochromic material that transitions to a first visual appearance in the presence of light (e.g. UV light), but that returns to the second visual appearance only in the absence of such light and at a temperature at a certain threshold.

Preferably, the photochromic material or materials employed in the photo-responsive layer transition to the first visual appearance in the presence of radiation of a predetermined wavelength (e.g. ultraviolet light), and transition to the second visual appearance in the presence of a separate and distinct stimulus, such as radiation outside the range of wavelengths that the device 100 is configured to monitor and indicate for. That is, for a device configured to detect and indicate the presence (or absence) of ultraviolet radiation, the photochromic material or materials employed in the photo-responsive layer preferably transition to the first visual appearance upon exposure to radiation having wavelengths below 10 nm and above 400 nm (whether or not other types of radiation are present), and transition to the second visual appearance upon exposure to visible light having wavelengths above 400 nm (in the absence or reduced presence of ultraviolet light).

Examples of the photochromic materials employed in the photo-responsive layer 200 include materials in the class referred to as diarylethenes. An example of a diarylethene is 1,2-Bis(2,4-dimethyl-5-phenyl-3thienyl)-3,3,4,4,5,5-hexafluoro-1-cyclopentene, which undergoes a structural change in the presence of ultraviolet radiation (specifically, the molecule has an open-ring configuration in the absence of ultraviolet radiation, and a closed-ring configuration in the presence of ultraviolet radiation). The photochromic material can also be selected from various other classes of photochromic materials that will now be apparent to those skilled in the art as suitable for use in the device 100.

Figure 3A:
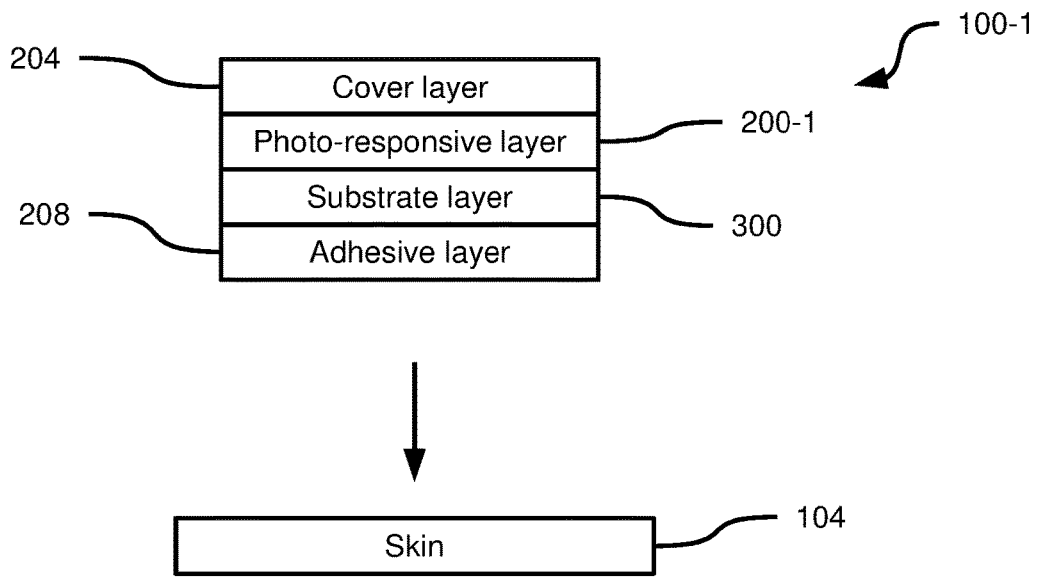
FIGS. 3A-3B, 4A-4B and 5 depict schematic cross-sections of the device of FIGS. 1A-1B, according to further non-limiting embodiments.
Figure 3B:
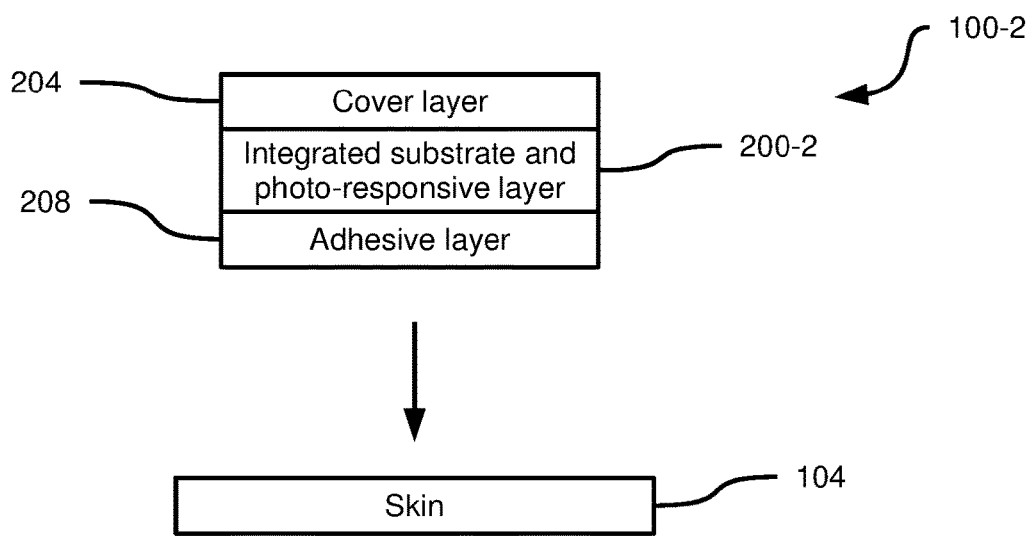

Turning now to FIGS. 3A and 3B, example implementations of the device 100 are discussed, in which a substrate material is included between the cover layer 204 and the adhesive layer 208 for supporting the photo-responsive layer 200. In these and subsequent examples, the removable backing 212 is omitted for simplicity of illustration, though it is contemplated that the removable backing 212 may be employed in any of the embodiments discussed below.

FIG. 3A illustrates an embodiment 100-1 of the device 100. The device 100-1 includes the cover layer 204 and the adhesive layer 208 as described above and as further detailed below. In addition, the device 100-1 includes a substrate layer 300 between the adhesive layer 208 and a photo-responsive layer 200-1. Herein, numerals appended to a reference numeral with a dash are employed to identify variations of the structure identified by the "base" numeral. Thus, references to the device 100 are intended as collective references to the device 100-1 and any other variations described herein. The same nomenclature is employed for components of the device 100.

The substrate layer 300 includes the above-mentioned substrate material, and provides a structural base on which the photo-responsive layer 200-1 and the cover layer 204 are supported, and on which the adhesive layer 208 is supported. In some embodiments, the substrate layer 300 and the adhesive layer 208 are manufactured together as an adhesive tape via the application of adhesive to a substrate membrane. For example, in some embodiments, during manufacture of the device 100-1 the photo-responsive layer 200-1 is applied to the substrate layer 300 as an ink. The application of the photo-responsive layer to the substrate layer 300 can be achieved by any suitable technology (e.g. printing, corona surface treatments and the like). In other embodiments, the photo-responsive layer 200-1 is applied to the substrate layer as a film (either in liquid or in solid state) containing an adhesive to bond to the substrate layer 300.

The substrate material forming the substrate layer 300 includes a polymer film; thus, the photochromic material and any carrier materials making up the photo-responsive layer 200-1 are applied to the upper surface of the polymer film. In some embodiments, in which the photo-responsive layer is printed onto the substrate layer 300, the polymer film is selected for suitability for the relevant printing technology, such as a solvent-based printing application. For example, the photochromic material can be dissolved (e.g. at about 3% by mass) in any suitable carrier material, such as FGN 4121. Thus, in certain embodiments the substrate material is a plastic film, such as a polyester, polyethylene or polyurethane film or membrane. In embodiments such as those discussed herein, in which the device 100 is applied to the skin 104 of a user, the substrate membrane is preferably breathable. In some embodiments, at least a portion of the substrate layer 300 is translucent or transparent to one or both of visible and ultraviolet radiation. In other embodiments, however, the substrate layer 300 is opaque.

Turning to FIG. 3B, another embodiment 100-2 of the device 100 is illustrated, including a photo-responsive layer 200-2 integrated with the above-mentioned substrate material. Thus, rather than being deposited or otherwise applied on the upper surface of the substrate layer 300, in the device 100-2, the photochromic material is physically or chemically integrated within the substrate material. As noted above in connection with FIG. 3A, the substrate material is a polymer suitable for forming into films in some embodiments. For example, the polymer can be a plastic (preferably breathable and/or translucent) such as polyester, polyethylene or polyurethane. As will now be apparent, in the embodiment shown in FIG. 3B the substrate material is preferably translucent or transparent to ultraviolet radiation.

In some embodiments, the photochromic material is physically integrated with the substrate layer by cross-linking of the polymer. In other words, the integrated layer 200-2 is manufactured with the photochromic material and the substrate material being integrated during the formation of the integrated layer 200-2 rather than the substrate material being formed into a layer separately from the photochromic material (as in FIG. 3A).

Figure 4A:
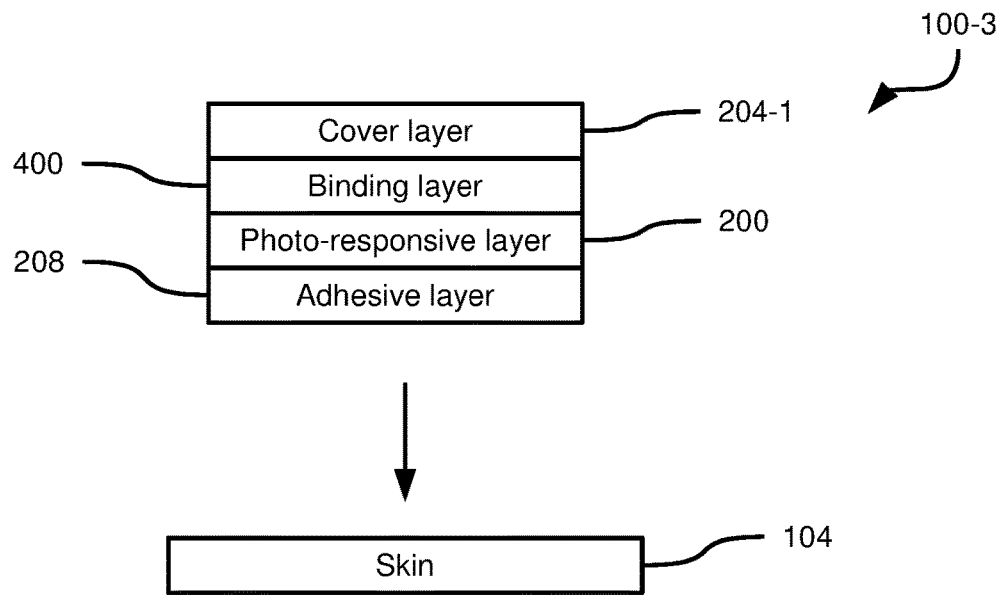
Figure 4B:
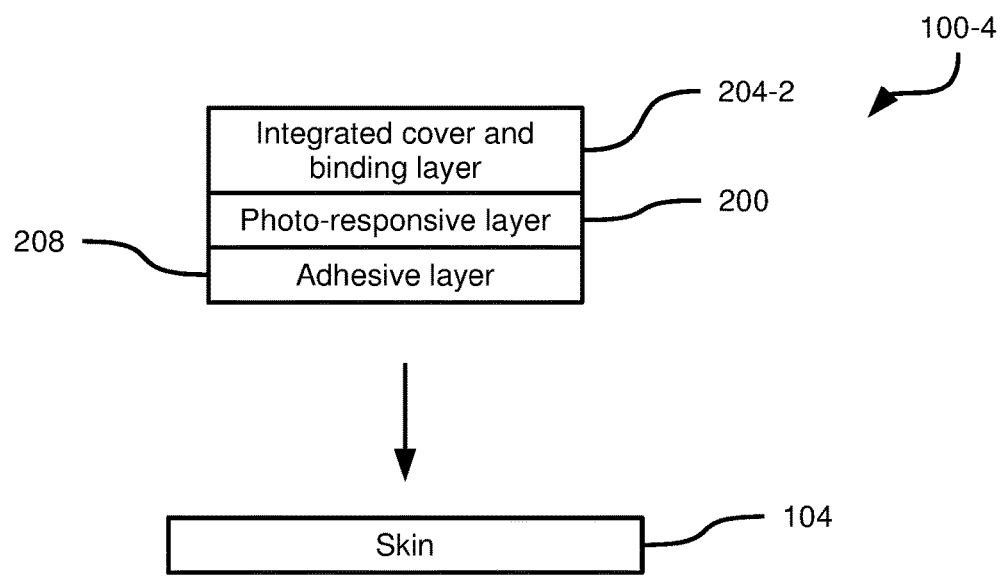

As noted earlier, the device 100 also includes the cover layer 204, whose composition and structure enable the device 100 to mimic certain properties of the skin 104. Referring now to FIGS. 4A and 4B, example implementations of the device 100 are discussed, in particular with regard to the implementation of the cover layer 204. Except as noted below, the example implementations of the cover layer 204 discussed below are applicable to any of the embodiments described above (including both of the devices 100-1 and 100-2 illustrated in FIGS. 2A-2B).

FIG. 4A illustrates a device 100-3 including the photo-responsive layer 200 (i.e. as noted above, either of the layers 200-1 and 200-2, or any other suitable variation thereof) and the adhesive layer 208. In addition, the device 100-3 includes a cover layer 204-1 connected to the photo-responsive layer 200 via a binding layer 400.

The cover layer 204-1 includes a polymer suitable for forming into a film. In some embodiments, the polymer is one of a polysaccharide and a polypeptide. In embodiments employing a polysaccharide polymer, polymers with cellulose backbones may be employed in the cover layer 204. More specifically, in some embodiments the polymer is chitosan, and the cover layer 204-1 is thus a film of chitosan, formed according to any suitable technique that will be apparent to those skilled in the art. The film of chitosan is degradable, and thus wears away in response to various environmental factors including abrasion, water exposure and the like. The rate at which the film degrades permits sunscreen to wear off device 100 at a rate is similar to which sunscreen is worn off skin 104, and thus the cover layer 204-1 is said to mimic the skin 104.

The chitosan film comprises up to about 15% chitosan by mass. In certain embodiments, the chitosan film preferably comprises less than 10% chitosan by mass. The film can also include a solvent, such as acetic acid (e.g. up to about 10% by mass, and preferably below 5% by mass), to aid in the dissolution of the chitosan (permitting greater proportions of chitosan, e.g. up to about 15%, to be employed, thus increasing the mechanical strength of the resulting cover layer 204-1). The remainder of the film is water, with the exception of certain optional additives, discussed below. An example chitosan film includes 3% chitosan by mass and 5% glacial acetic acid by mass.

In other embodiments, the polymer employed for the cover layer 204-1 is a polypeptide, such as gliadin (a component of gluten). The cover layer 204-1 is thus a film of gliadin formed according to any suitable technique that will be apparent to those skilled in the art. The film of gliadin is degradable and therefore simulates (i.e. mimics) the wear characteristics of the outer layer of the skin 104. The gliadin film comprises up to about 15% gliadin by mass. In certain embodiments, the gliadin film preferably comprises less than 10% gliadin by mass. The remainder of the film is water, with the exception of certain optional additives, discussed below.

In further embodiments, the cover layer 204-1 comprises a combination of a polysaccharide such as chitosan and a polypeptide such as gliadin. In such embodiments, the proportion of polymer in the cover layer 204-1 is up to about 20%, and is preferably below 10%, as in connection with the embodiments discussed above. However, the total proportion of polymer in the cover layer 204-1 is divided amongst the polysaccharide and the polypeptide. For example, in some embodiments the cover layer 204-1 comprises 5% chitosan and 5% gliadin. In other embodiments, one of the polymers accounts for a greater proportion of the cover layer 204-1 than the other. More generally, therefore, the cover layer 204-1 includes between about 0% and about 15% chitosan, with the remainder of the about 15% by mass being gliadin. The film also includes, in some embodiments, a solvent such as acetic acid to aid the dilution of the polymers therein. The remainder of the film is water, with the exception of certain optional additives, discussed below. Other combinations of polymers will also occur to those skilled in the art.

The cover layer 204-1, in addition to the polymers, water and (in some embodiments) solvent noted above, can include various additives. The additives include, in some embodiments, any one of or any suitable combination of thickening agents such as polyvinylpyrrolidone (e.g. about 1-5% by mass). Other thickening agents include Gel-maker™ Style (e.g. about 0.5% by mass) and glycerin (e.g. about 1-10% by mass) for chitosan-based films, and triethanolamine (e.g. about 20% by mass for embodiments employing chitosan, or about 60% by mass for embodiments employing gliadin alone) and xanthan gum (e.g. about 0.5-1.5% by mass) for gliadin-based films. Thickening agents are employed to increase the viscosity of the polymer film. As will now be apparent, during manufacturing of the device 100, greater viscosities than those provided by combinations of the above-mentioned polymers with water alone may be more suitable to certain manufacturing techniques, such as continual coating processes. For example, greater viscosities may allow the film to spread more evenly during manufacturing than in the absence of the above-mentioned thickening agents. The resulting cover layer 204-1 may therefore have an extended lifetime (i.e. may wear less easily).

The additives further include, in certain embodiments, pH-adjusting compounds. In particular, bases such as sodium hydroxide and triethanolamine are added to the film to achieve a target pH. The target pH is typically between about 5 and about 5.6. In some embodiments, the target pH is between 5.2 and 5.6. In some embodiments, the target pH is about 5.4, at which the distribution of the film is even, resulting in a cover layer 204-1 with a consistent thickness and therefore a predictable wear rate over the entire area of the device 100. For example, for a film comprising 1% chitosan and 1% acetic acid, about 0.005% sodium hydroxide and 2% triethanolamine were sufficient to balance the pH of the film at about 5.4. The above-identified ranges of pH have been found to be more effective than pH values between about 6 and about 7.

The additives further include, in certain embodiments, strength-enhancing materials that increase the mechanical strength of the resulting cover layer 204-1. Such additives include, for example, any suitable one of or any suitable combination of, triethanolamine (e.g. about 2% by mass), sodium PCA (e.g. about 0.5% by mass) and propylene glycol (e.g. about 5% by mass). The above-mentioned additives increase the ability of the film to absorb water, and thus are employed to give the film a water content similar to that of the skin 104.

In further embodiments, the additives also include a preservative, such as Ethylenediaminetetraacetic acid (EDTA) (e.g. up to about 0.25% by mass), Butylated hydroxytoluene (BHT) (e.g. up to about 0.05% by mass) and propyl paraben (e.g. up to about 0.5% by mass) or the like. Further additives that may be employed in the cover layer 204-1 include antioxidants such as ascorbic acid/ascorbates, propyl gallate, methylchloroisothiazolinone and/or anti-bacterial/anti-microbial agents such as benzoic acid, para-hydroxybenzoic acid (PHBA), sodium benzoate, hydroxybenzoate, citrus combo (e.g. up to about 1% by mass) or other suitable anti-bacterial/anti-microbial agents.

The cover layer 204-1 is translucent at least to ultraviolet radiation (in order to permit exposure of the underlying photo-responsive layer 200 to ultraviolet light when sunscreen has not been applied, or has worn off). Further, the cover layer 204-1 has a thickness selected to absorb at least a single application of sunscreen. In some embodiments, the cover layer 204-1 is provided with a greater thickness capable of absorbing two or more separate applications of sunscreen, permitting the device 100 to be re-used (i.e. permitting additional sunscreen to be applied) after the initial application of sunscreen has worn off. For example, the cover layer 204-1 can be deposited as a wet film having a thickness of between about 18 microns and about 220 microns.

As mentioned above, the device 100-3 also includes a binding layer 400 for binding the cover layer 204-1 to the photo-responsive layer 200. In some embodiments, the binding layer 400 includes an adhesive. The adhesive is translucent at least to ultraviolet radiation, and is preferably resistant to water and lotions such as sunscreen. For example, medical grade Pros-Aide™ adhesives are employed in some embodiments.

In some embodiments, the binding layer 400 includes a substrate material, such as a polymer film as described above in connection with the substrate layer 300. For example, in some embodiments the binding layer 400 includes a plastic membrane, such as polyethylene (e.g. low-density polyethylene) or polyurethane. A primer or adhesive as described above can be applied to one or both sides of the membrane, for binding the membrane to each of the photo-responsive layer 200 and the cover layer 204-1. Different primers or adhesives can be selected for each side of the membrane, for compatibility with the photo-responsive layer 200 and the cover layer 204-1, respectively.

Referring to FIG. 4B, a device 100-4 is illustrated according to a further embodiment. The device 100-4 includes an integrated cover and binding layer 204-2 rather than a separate binding layer as in FIG. 4A. The cover layer 204-2 includes a polymer film as described above, with the exception that the film also includes a binding material, including any one of, or combination of, an adhesive (e.g. Pros-Aide™ adhesives), and a surfactant or surface wetting agent. The surfactant changes the hydrophobicity of the underlying material (e.g. the photo-responsive layer 200 and the substrate layer 300, when employed). Making the underlying surface more hydrophilic enables the cover layer 204-2 to attach more favourably to the underlying surface. For example, the cover layer 204-2 includes (in addition to the polymers and optional additives as discussed above) example, Capstone™ FS-34 (e.g. about 0.5% by volume).

Figure 5:
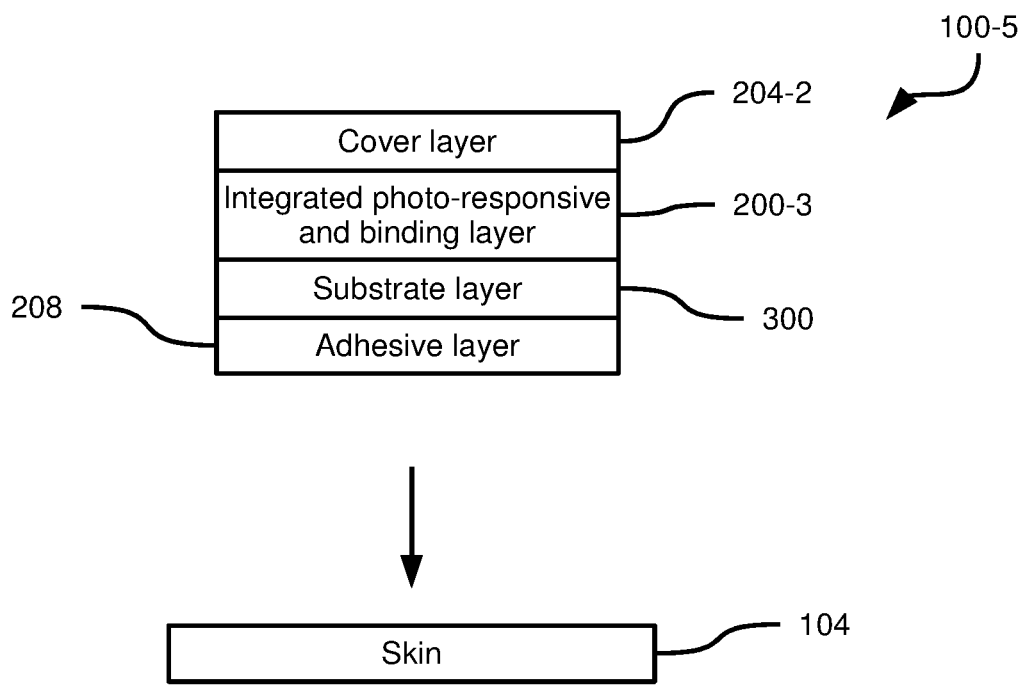

Turning to FIG. 5, in further embodiments, the above-mentioned binding material is integrated with the photo-responsive layer 200. In particular, a device 100-5 according to certain embodiments includes the cover layer 204-2 as described above, as well as the substrate layer 300 as discussed earlier, and an integrated photo-responsive and binding layer 500. The layer 500 includes a photochromic material as discussed earlier, in addition to any suitable combination of adhesives and surfactants as mentioned in connection with FIG. 4B.

As will now be apparent, in some embodiments, the binding layer can simply be omitted. The cover layer 204 and the photo-responsive layer 200 can instead be formulated to adhere to each other, for example by the use of surface treatment methods (e.g. high frequency discharge). In further embodiments, combinations of the implementations of binding material shown in FIGS. 4A, 4B and 5 are employed. For example, in some embodiments the photo-responsive layer contains the photochromic material and an adhesive as discussed in connection with FIG. 5, and an additional layer (e.g. a plastic membrane) is included between the integrated photo-responsive and binding layer and the cover layer 204.

Figure 6:
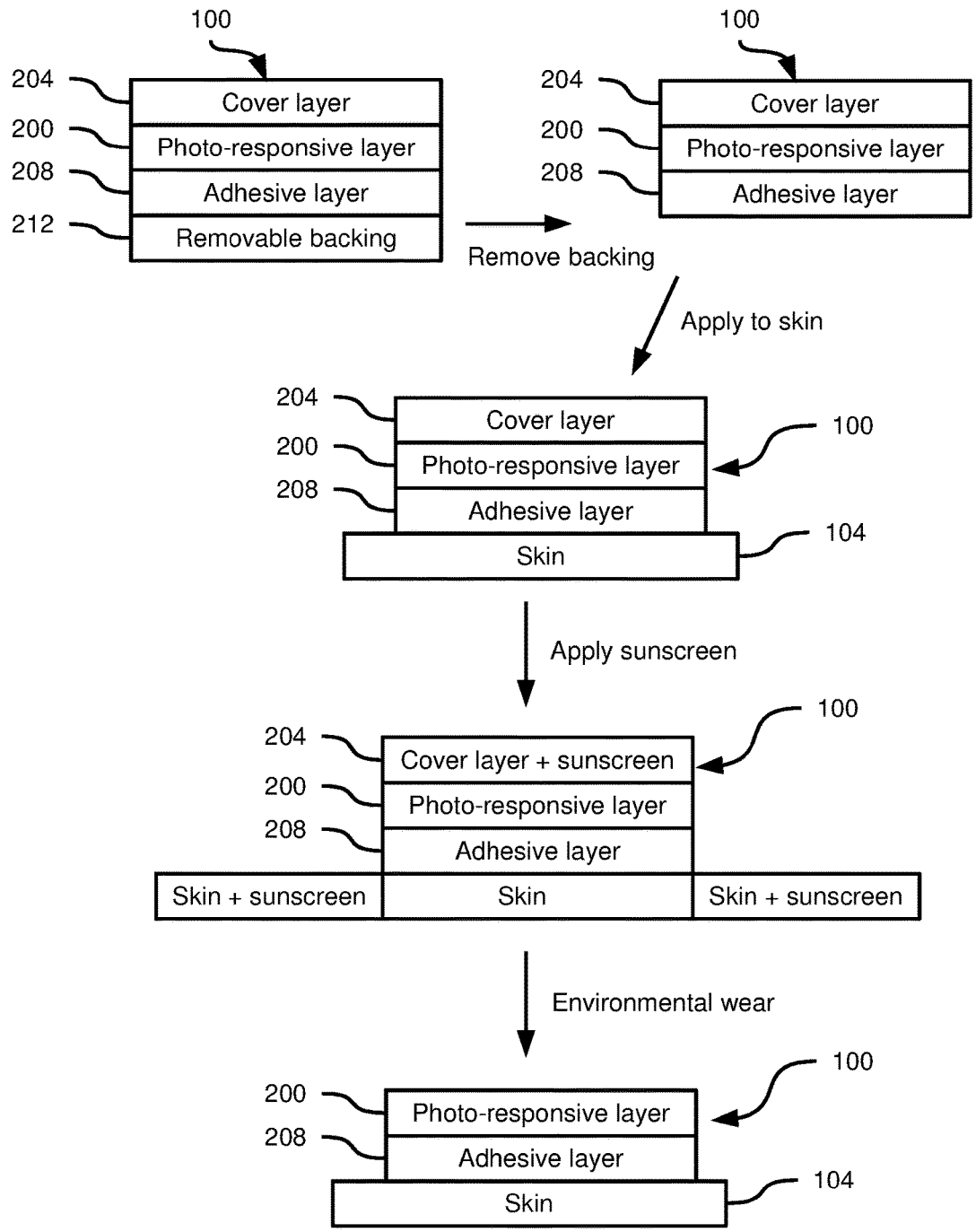
FIG. 6 depicts schematic cross-sections of the device of FIGS. 1A-1B in use, according to a non-limiting embodiment.

Referring now to FIG. 6, an example use case for a device 100 is illustrated. In particular, prior to use the removable backing 212 (if included) is removed. The device 100 is then applied to the surface for which detection and indication of light is desired. In the present example, the device 100 is applied to the skin 104 of a user, for detecting and indicating exposure of the skin to ultraviolet light. As will be apparent, immediately following application of the device 100 to the skin 104, the photo-responsive layer may be exposed to ultraviolet light (as no sunscreen has been applied). The photo-responsive layer may therefore transition to the first visual appearance as described above.

Following application of the device 100 to the skin 104, sunscreen is applied to the skin 104 and the device 100. The skin 104 and the cover layer 204 absorb the sunscreen, and are therefore protected from ultraviolet light. Following the application of sunscreen, the photo-responsive layer either transitions to the second visual appearance (if it was in the first visual appearance), or remains in the second visual appearance. However, following a certain degree of environmental wear, the cover layer 204 (and the sunscreen carried therein) has worn away, as has the outer layer of dead skin cells of the skin 104. Thus, the underlying (now outer) layer of the skin 104 is no longer protected from ultraviolet light. As a result, the photo-responsive layer 200 transitions to the first visual appearance, indicating exposure to ultraviolet light.

In embodiments in which the cover layer 204 has a greater thickness, sunscreen may be reapplied to the remaining (i.e. not worn away) portion of the cover layer 204. In the example illustrated in FIG. 6, however, the device 100 is discarded, and a second device 100 may be applied, prior to the reapplication of sunscreen.

Figure 7:
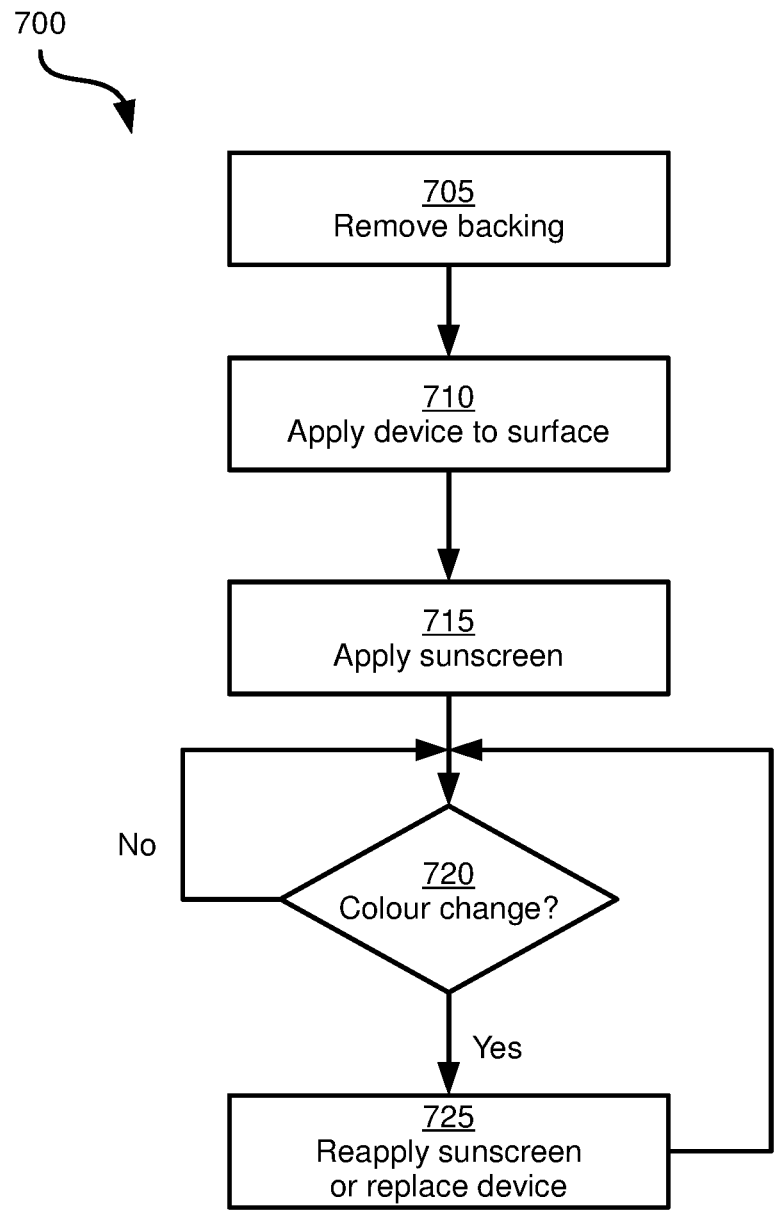
FIG. 7 depicts a method of using the device of FIGS. 1A-1B, according to a non-limiting embodiment.

From the above discussion, a method of using the device 100 will also now be apparent. In particular, referring to FIG. 7, a method 700 of using the device 100 is illustrated. At block 705, the backing 212 is removed, if present. At block 710, the device 100 is applied to the desired surface (e.g. the skin 104 of the user). At block 715, sunscreen is applied to the surface and the applied device 100. At block 720, a determination is made as to whether the device 100 has transitioned to the first visual appearance, indicating that the sunscreen is no longer effectively protecting the skin from ultraviolet light. When the determination is negative, the determination at block 720 is repeated. When the determination is affirmative, however, the performance of method 700 proceeds to block 725, at which sunscreen is reapplied (for devices with sufficiently thick cover layers 204 to allow reapplication) or the device is replaced.

Figure 8A:
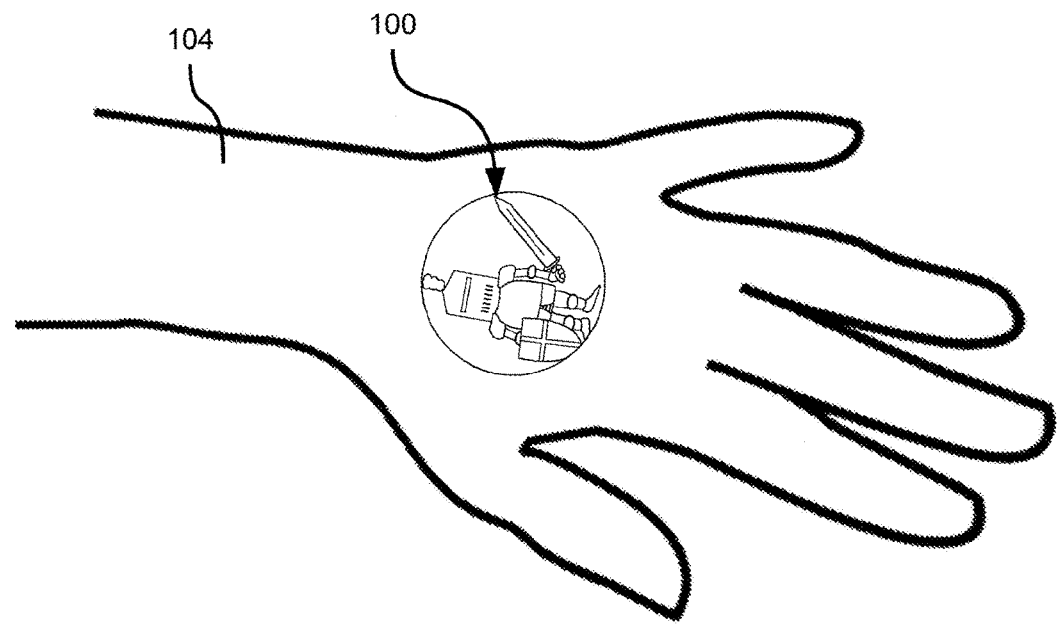
FIGS. 8A and 8B depict a device for detecting exposure to light in first and second visual appearances, according to another non-limiting embodiment.
Figure 8B:
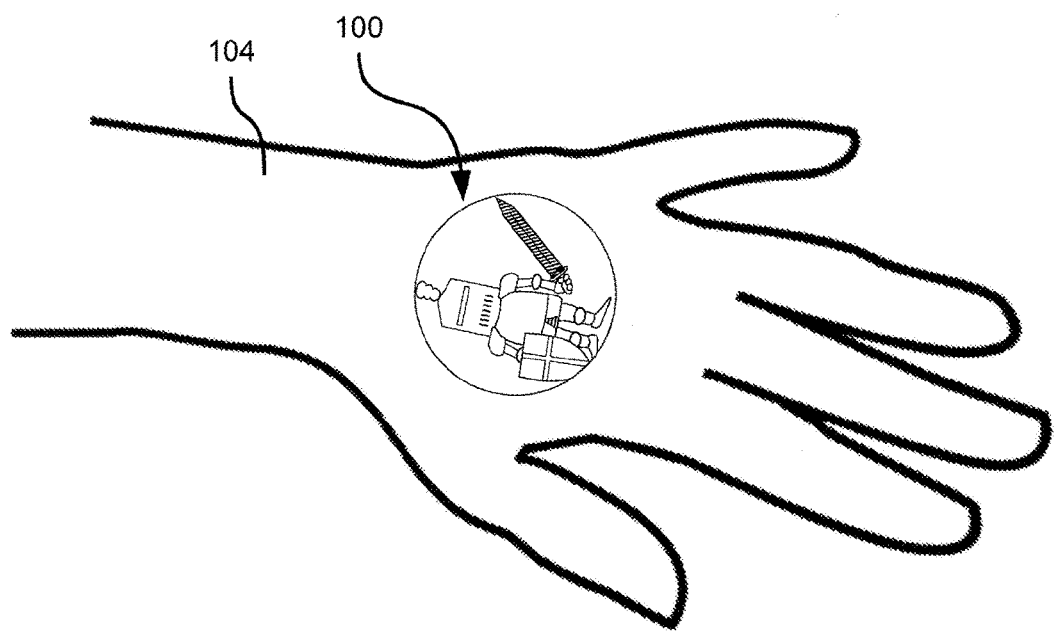

Variations in addition to those discussed are also contemplated. For example, in some embodiments the device 100 includes graphical indicia (e.g. printed on the substrate layer 300). As illustrated in FIGS. 8A and 8B, for example, the device 100 includes a graphic of a knight printed in non-photochromic ink. When the device 100 transitions from the second visual appearance (FIG. 8A) to the second visual appearance (FIG. 8B), a portion of the knight (the sword, in the present example) changes colour. In other words, the photo-responsive layer 200 includes photochromic material in only a portion of the area of the device 100, and the portion can coincide with a portion of a non-photochromic graphic on the device 100. Further, although the device 100 is illustrated as being circular in FIGS. 1A-1B and 8A-8B, the device 100 can be provided in a wide variety of other shapes (e.g. other polygons, letters, animals and the like).

The scope of the claims should not be limited by the embodiments set forth in the above examples, but should be given the broadest interpretation consistent with the description as a whole.

The invention claimed is:

1. A device for detecting exposure to light, comprising:
   a photo-responsive layer including a photochromic material;
   a skin-mimicking cover layer covering a first side of the photo-responsive layer, the cover layer to absorb an amount of sunscreen, the cover layer containing a polysaccharide to permit the amount of sunscreen to wear off the cover layer by abrasion at a rate substantially the same as a rate at which the amount of sunscreen would wear off human skin by abrasion; and
   an adhesive layer configured to couple a second side of the photo-responsive layer opposite the first side to a surface.

2. The device of claim 1, the photo-responsive layer having a first visual appearance in the presence of light of a predetermined wavelength, and a second visual appearance in the absence of the light of the predetermined wavelength.

3. The device of claim 2, wherein the predetermined wavelength between 10 nm and 400 nm.

4. The device of claim 2, wherein the first visual appearance has a first colour and the second visual appearance has a second colour.

5. The device of claim 2, wherein the first visual appearance has a first colour and the second visual appearance is colourless.

6. The device of claim 1, further comprising a substrate material between the cover layer and the adhesive layer.

7. The device of claim 6, further comprising a substrate layer containing the substrate material; wherein the photo-responsive layer is deposited on the substrate layer.

8. The device of claim 6, wherein the substrate material is integrated with the photo-responsive layer.

9. The device of claim 7, the substrate material including a polymer film.

10. The device of claim 9, wherein the substrate material includes a plastic.

11. The device of claim 9, wherein the substrate includes a graphic indicia thereon.

12. The device of claim 1, wherein the photochromic material includes a diarylethene.

13. The device of claim 1, wherein the polysaccharide is degradable.

14. The device of claim 1, wherein the polysaccharide comprises chitosan.

15. The device of claim 1, wherein the cover layer is translucent.

16. The device of claim 1, further comprising a binding material configured to adhere the cover layer and the photo-responsive layer.

17. The device of claim 16, wherein the binding material is integrated with one of the cover layer and the photo-responsive layer.

18. The device of claim 1, further comprising a removable backing covering a side of the adhesive layer opposite the second side of the photo-responsive layer, the removable backing being removable prior to application of the device to the surface.

19. The device of claim 14, wherein the cover layer comprises about 3% chitosan by mass.

20. The device of claim 14, wherein the cover layer further comprises a thickening agent comprising glycerin.

21. The device of claim 1, wherein the cover layer further comprises a strength-enhancing material comprising one or more of: triethanolamine, sodium PCA, and propylene glycol.

* * * * *